June 11, 1940.  S. B. APPLEBAUM  2,204,062
WATER DEAERATOR AND PURIFIER
Filed July 10, 1937   2 Sheets-Sheet 2

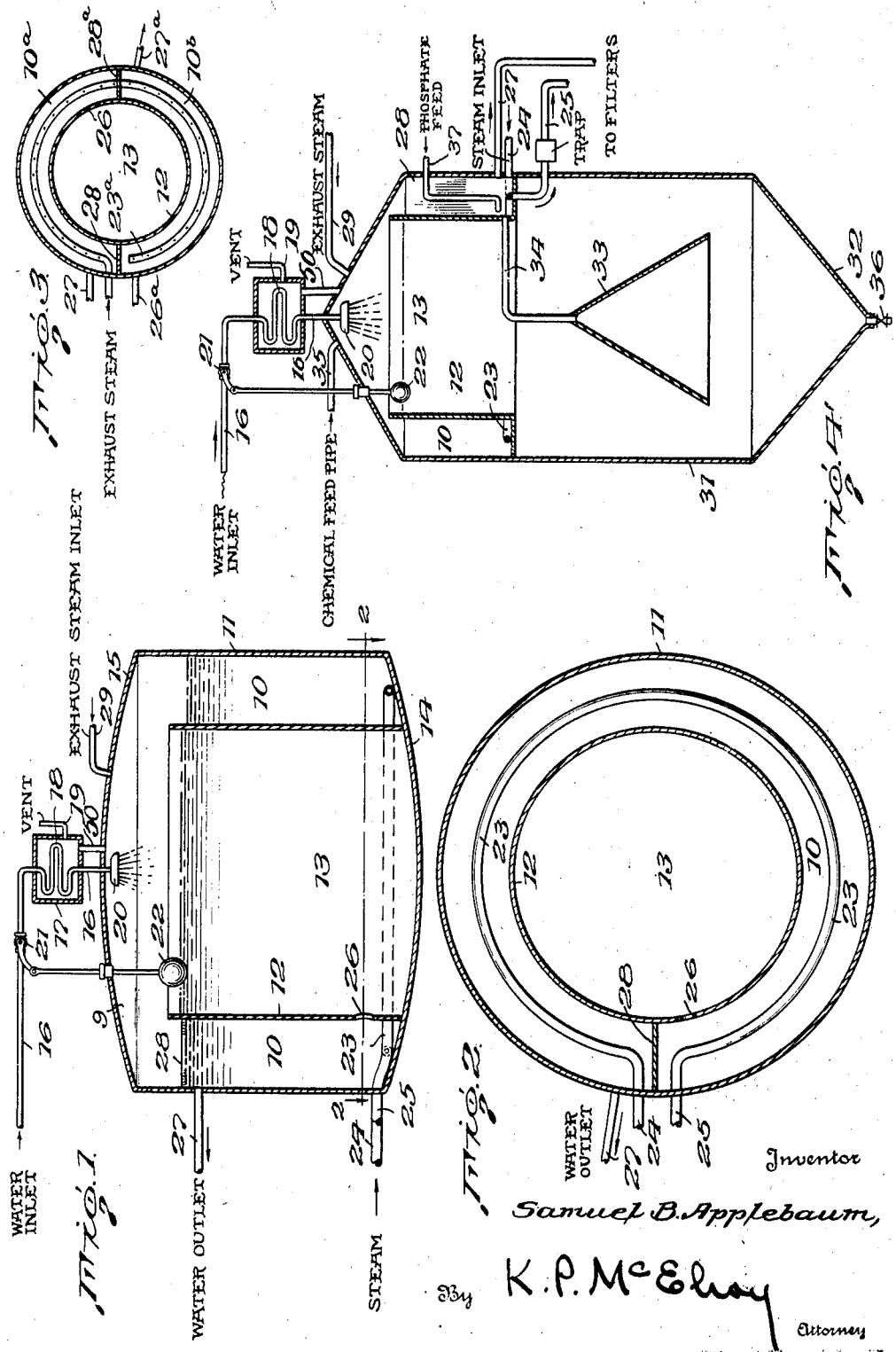

SAMUEL B. APPLEBAUM
INVENTOR.

BY *[signature]*

ATTORNEY.

Patented June 11, 1940

2,204,062

UNITED STATES PATENT OFFICE 2,204,062

WATER DEAERATOR AND PURIFIER

Samuel B. Applebaum, New York, N. Y., assignor to The Permutit Company, New York, N. Y., a corporation of Delaware Application July 10, 1937, Serial No. 153,031

9 Claims. (Cl. 210—14)

This invention or discovery relates to water deaerators and purifiers; and it comprises apparatus for purifying water for boiler feed or the like, including a closed casing, annular partition means within the casing defining an outer annular chamber and an inner chamber within and in communication with the outer chamber over the top of the partition means, the partition means having an orifice to provide communication between the two chambers at their lower portions, conduit means constructed and arranged to deliver a flow of water to the interior of the casing and distribute into a steam space above the top portion of the inner chamber, condenser means for heating the flow prior to its introduction into the casing, water outlet means for the annular chamber, an annular steam heating coil in the lower portion of the annular chamber, a cross partition in the annular chamber located between the water outlet means and said orifice so as to cause water entering the annular chamber through the orifice to take a circuitous path before flowing through the outlet means, and conduit means for delivering steam from said steam space to the condenser means; chemical treatment means sometimes being additionally provided; all as more fully hereinafter set forth and as claimed.

In utilizing water for various industrial operations such, for example, as in steam boilers, it is necessary to purify the usual raw water in various respects. Water used in feeding boilers is usually softened and in modern plants having economizers, preheaters, etc. it is particularly desirable to deaerate the boiler feed water to prevent corrosion in the boiler and in accessory apparatus. For softening make-up or feed water the zeolite method and the lime soda treatment are used. For deaeration of the water fed to the boiler various devices have been used, some of which include means for chemical treatment of the water with sedimentation. These deaerators leave much to be desired in efficiency and economy.

In deaerating water or disengaging gases therefrom by heating the water, two factors are of importance. First, the temperature needs to be high enough to minimize solubility of oxygen or other gases in the water and, second, the partial pressure of the gas in contact with the water should be kept low. Control of these two factors with efficiency in the heating of the water involves some difficulty. An object achieved in the present invention is a maximum deaeration or removal of gases from water with a maximum of efficiency and economy in the use of steam for heating the water. A further achieved object is efficient deaeration heating associated with purification of the water by chemical treatment when desired.

In the present invention I have found that heating of the water by steam contact under countercurrent conditions is of particular advantage in steam economy and in maintaining optimum conditions for removal of gases, particularly air, dissolved in water. I arrange the deaerator as an annular chamber enclosing an inner chamber in which raw water may be treated chemically when desired. For deaeration in the annular chamber the water is heated to its boiling point by a steam coil co-extensive with the annular chamber and the water to be degasified is admitted to the chamber and flows around the annulus in countercurrent to the flow of steam in the coil, thence out of the chamber, a partition in the chamber being utilized to prevent short circuiting of the water flow. This arrangement provides excellent means for boiling the water in the annular chamber and for disengagement of gases from the water by heat and by quick removal of disengaged gas for holding the partial pressure thereof upon the water at a minimum. The steam generated by the boiling of the water is utilized for preheating the incoming water by direct contact as well as in a vent condenser disposed in the top of the deaerator through which raw water is admitted to the inner chamber, the gases being vented from the condenser in a known manner.

The arrangement of the annular chamber enclosing an inner chamber through which the water is passed to be boiled in the annular compartment by countercurrent contact with a steam flow is advantageous for combined heating of the water for chemical treatment and sedimentation such as by the lime soda process. To effect this combination heating the annular deaerator boiling compartment, in a modification of the invention, is made an integral part of a sedimentation tank provided with the usual sludge cone and conical up-take. The conical up-take is made to deliver into the re-boiler deaerator so that the settled water passes through the boiling compartment in countercurrent to steam as described. The chemically purified water is thus boiled for deaeration and the steam evolved is economically utilized in preheating the raw water for chemical treatment.

The steam heating coil in the deaerating compartment may be solid pipe from which water condensed in the steam heating is sent to join the effluent deaerated water. Or it may be a perforated pipe delivering exhaust steam or live steam into the water undergoing deaeration.

The apparatus as described is simple to operate and highly efficient both in the deaeration and also in the utilization of heat.

In the accompanying drawing I have shown more or less diagrammatically apparatus within my invention. In this showing—

Fig. 1 is a view in vertical section of the deaerator unit;

Fig. 2 is a horizontal sectional view of the unit of Fig. 1 along the line 2—2 looking in the direction of the arrows;

Fig. 3 is a view in horizontal section of a modification of the deaerator compartment in the unit of Fig. 1;

Fig. 4 is a view in vertical section of the deaerator unit integral with a sedimentation tank for chemical treatment;

Figure 8:
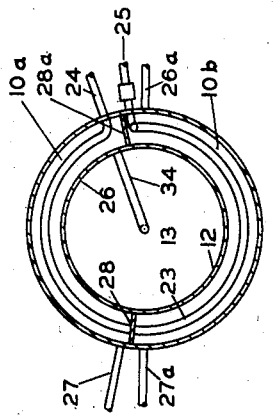
Fig. 8 is a horizontal section along line 8—8 of Fig. 7.

Referring to the figures, the deaerator unit 9 comprises an annular chamber 10 having, as shown, an outer cylindrical wall 11, with an inner wall 12, and an inner chamber 13 formed by the wall 12. Both chambers have a common bottom piece 14. The top 15 covers the unit, there being an open space between the wall 12 and the top 15 giving open communication between the annular and the inner chambers. An exhaust steam inlet 29 is connected to the top 15. A water inlet pipe 16 enters the top of the unit through a vent condenser 17 provided with a vent 19, the raw water being heated on its way to the unit by passage through a coil 18. The condenser has connection with the deaerator unit through its top 15 by means of a conduit 50. The water inlet pipe 16 goes through the top 15 and has, as shown, a spraying distributor 20. The water inlet is regulated by a float valve 21 operated by float 22 under control of the level of water in the inner chamber. In the annular boiler compartment 10 and coextensive therewith is a steam coil 23 with an inlet 24 and an outlet 25 which may be trapped. An opening 26 is formed in the wall 12 near the outlet end of the steam coil 23 and a water outlet 27 is located in the outer wall 11 at a point near the inlet end of the steam coil, a baffle plate or partition wall 28 in the boiler chamber 10 being interposed between the inlet opening 26 and the water outlet 27.

Figure 5:
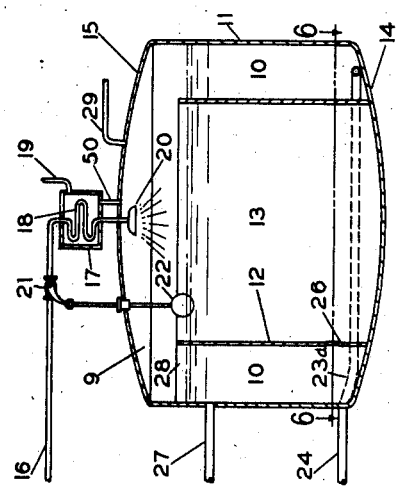
Fig. 5 is a view in vertical section of a modification of the unit shown in Fig. 1.
Figure 6:
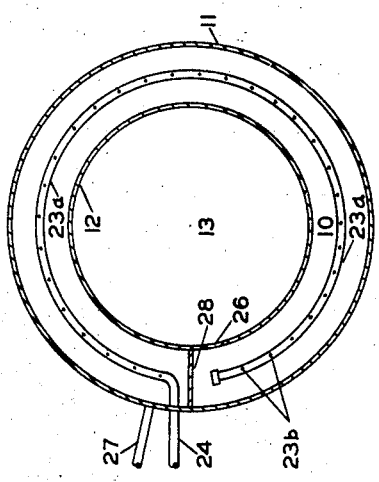
Fig. 6 is a horizontal section along line 6—6 of Fig. 5.

In the modifications of the deaerator shown in Figs. 3, 5 and 6, the steam coil designated 23a is provided with perforations 23b (twice), the perforations providing outlet for the steam into the surrounding body of water. In the modification shown in Fig. 3 the baffle 28 and a second similar baffle 28a divide the annular compartment into two sections 10a and 10b. Make-up water admitted through pipe 16 enters section 10a through inlet 26 and leaves it through outlet 27. Condensate from steam utilizing equipment simultaneously enters compartment 10b through inlet 26a and leaves it through outlet 27a. Thus, makeup water and condensate are deaerated in the two sections without being intermingled with each other. With the perforated coil shown in Figs. 3, 5 and 6, the exhaust steam inlet 29 is omitted, exhaust steam being admitted to the perforated steam coil 23a, the steam emerging through the perforations 23b and bubbling up through the water in chamber 10 or sections 10a and 10b, respectively.

In operation, water admitted to the apparatus through inlet pipe 16 is preheated by condensation of steam delivered to the vent condenser 17 through the conduit 50. It is further heated by spraying through the steam space above the water level in chamber 13. The water rises to a desired level determined by the float 22 operating valve 21. Water enters the boiler compartment 10 through opening 26 and is boiled by the heat of steam coil 23. The steam generated on boiling of the water rises in bubbles through the water carrying the air and other gases from the water into the top portion of the apparatus. In the apparatus shown in Figs. 3, 5 and 6, the steam emerging from the perforations in pipe 23a similarly rises through the water, heating it by direct contact to the boiling point and carrying the disengaged gases into the top portion of the apparatus. The steam generated by boiling in Figs. 1 and 2, or the uncondensed portion of the steam emerging from pipe 23a in Figs. 3, 5 and 6 contacts with the water entering through spray 20 whereby a substantial portion of the steam is condensed. The remaining steam passes into condenser 17, serving to preheat the incoming water, the gases being vented at 19. The hot deaerated water leaves the apparatus through the outlet 27 and is sent to a boiler or other point of use, not shown. The countercurrent flows of steam through the steam coil and water around the annular chamber from opening 26 to outlet 27 give extremely efficient heating of the water in chamber 10 and the evolution of steam by boiling the water or the distribution of steam through a perforated coil (as 23a) is so widespread that the partial pressure of gases is held extremely low. The result is high efficiency, both in heating and in deaerating.

In the combination of the deaerator with a tank for chemical treatment and sedimentation shown in Fig. 4, the arrangement of the deaerator is similar to that shown in Figures 1 and 2. The deaerator constitutes an integral top portion of a sedimentation tank 31 provided with the usual sludge cone 32 and conical uptake 33. This delivers through a pipe 34 into chamber 10 near the outlet end of the steam coil. In the sedimentation tank the water may be given any desired chemical treatment by being mixed with chemicals sent to the tank through chemical feed pipe 35. The operation of deaeration is similar to that above described, the water being first settled and sludge drawn off through a bottom valve 36. Water condensed in the steam coil leaving through trapped outlet 25 may be sent to join the effluent deaerated water after the latter is passed through a filter (not shown). The annular arrangement of the deaerator chamber 10 in the sedimentation tank 31 leaves a central chamber 13 with relatively large circular cross section resulting in uniform downward flow of the water, desirable in the interest of efficient sedimentation. Fig. 4 shows, furthermore, that the location of the conical uptake below the deaerator compartment provides a fairly uniform cross section, symmetrical around the vertical axis of the tank, which likewise aids efficient sedimentation of precipitated impurities.

When the apparatus of Fig. 4 is operated with a mixture of lime and soda solution admitted through chemical feed pipe 35, the effluent water usually leaves the apparatus with a hardness of about 1½ to 2 grains per gallon. This residual hardness may be removed by feeding a dilute solution of an alkali phosphate such as sodium phosphate to the water after the precipitates resulting from the lime-soda reaction have been settled out. Such phosphate solution cannot be admitted into a pipe carrying the lime-soda treated water because the newly precipitated phosphate compounds are extremely adherent and would, therefore, form a heavy scale on the inside walls of such pipe. The annular compartment 10, however, is well suited for carrying out the phosphate after-treatment and to this end I provide a phosphate solution feed pipe 37 discharging into the annular compartment near the outlet from pipe 34, so as to mix with the incoming settled water. The long travel through the annular compartment provides sufficient time for completion of the phosphate reaction, and the water discharged from the annular compartment is thus free of both dissolved gases and hardness. The precipitates are maintained in suspension by the steam agitation in the annular compartment, and they are removed by filtration of the deaerated and treated water leaving through outlet 27.

Figure 7:
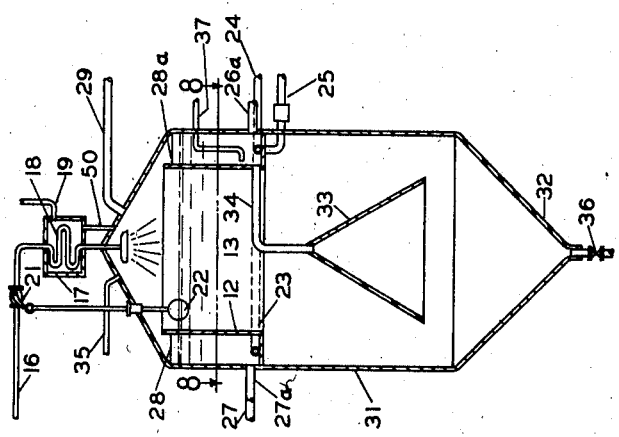
Fig. 7 is a view in vertical section of a modification of the apparatus of Fig. 4.

The deaerator chamber of Fig. 4 may, if desired, be divided into two sections 10a and 10b by means of two baffles 28 and 28a as shown in Figs. 7 and 8, the settled water passing from the uptake through section 10a to outlet 27 while condensate returns entering through pipe 26a and leaving through pipe 27a are simultaneously being deaerated in the second section 10b.

If desired, the chamber 10 may be arranged around the outside of the upper portion of the sedimentation tank 31, perforations in the dividing wall being provided for the passage of steam from chamber 10 into the upper part of the sedimentation tank.

What I claim is:

1. In water treating apparatus, means for removing gases from a flow of water, comprising in combination a casing, partition means within the casing defining an annular chamber and defining an inner chamber surrounded by the annular chamber, said chambers being in open communication at the top, vented condenser means for preheating a flow of water by condensation of steam therein, means for feeding the preheated water into the apparatus and distributing it over the top portion of the inner chamber, conduit means for delivering steam from the interior of the casing to said preheating means, said partition means being provided with a water passage adjacent its bottom to provide communication between the inner chamber and the annular chamber, outlet means for the annular chamber, cross partition means in the annular chamber so constructed and arranged as to cause water to pass circuitously around the annular chamber from said water passage to said outlet means, an annular steam heating coil near the bottom of the annular chamber and means for introducing steam into said coil.

2. The apparatus of claim 1 wherein the steam coil is perforated along its length, for direct introduction of steam into the annular chamber.

3. In water treating apparatus for removing gases from a flow of water, the combination of a casing, cylindrical partition means within the casing defining an outer annular chamber and an inner chamber surrounded by the annular chamber, said chambers being in open communication at the top, a passage through said partition means providing communication between the two chambers at their lower portions, vented condenser means for preheating a flow of water by condensation of steam therein, means for feeding the preheated water into the casing and distributing it over the top portion of the inner chamber, conduit means for delivering steam from the interior of the casing to said preheating means, water outlet means for the annular chamber, a cross partition in the annular chamber located between said water outlet means and said passage, an annular steam heating coil near the bottom of the annular chamber, means for introducing steam to one end of the coil located near the water outlet means, and means for withdrawing steam from the other end of the coil adjacent said passage, so as to provide countercurrent travel of heating steam and water in the annular chamber.

4. In water purifying apparatus, means for removing gases from a flow of water comprising a sedimentation tank, conduit means for introducing near the top of the tank a flow of water to be degassed, condenser means for preheating the flow of water prior to introduction into the tank, partition means in the tank defining a deaerator compartment of annular shape integral with the sedimentation tank, said compartment being disposed circumferentially about the upper portion of said tank and having open top communication with the upper portion of said tank, a steam heating coil within said compartment near the bottom thereof and having steam inlet and outlet means, a transverse wall in said compartment, water inlet and outlet means for the compartment, a conduit for settled water connecting the lower part of the sedimentation tank with said water inlet means for the compartment, means directing steam and gases from the top of the tank to the condenser means, and a gas vent for said condenser means.

5. In water purifying apparatus, means for removing gases from a flow of water comprising a sedimentation tank, conduit means for introducing into the top portion of the tank a flow of water to be degassed, condenser means so constructed and arranged as to preheat the flow of water prior to introduction into the tank, partition means in the tank defining a deaerator compartment of annular shape integral with the sedimentation tank, said compartment being disposed circumferentially about the upper portion of said tank and having open top communication with the upper portion of said tank, a steam heating coil within said annular compartment near the bottom thereof and having steam inlet means and outlet means adjacent opposite ends of the coil, water inlet means in said compartment adjacent the outlet end of the steam coil, water outlet means in the compartment adjacent the inlet end of the steam coil, a transverse wall in said compartment separating the water inlet from the water outlet, a conduit connected between the sedimentation tank and said deaerator compartment water inlet, means directing steam and gases from the top of the tank to the condenser means and a vent for gases in said condenser means.

6. An apparatus for deaerating and chemically treating a flow of water, comprising a sedimentation tank, partition means in the tank so constructed and arranged as to define an inner chamber and an outer annular deaerating compartment extending part way down the tank, said chamber and compartment being in open communication over the top of the partition means, conduit means for introducing a flow of water into the tank and distributing it at the top portion of said inner chamber, condenser means so constructed and arranged as to preheat the flow of water prior to its introduction into the tank, a chemical feed pipe extending through the tank and so constructed and arranged as to discharge chemical into the top portion of the inner chamber, an uptake in the lower part of the sedimentation tank, a conduit connection between the uptake and said annular compartment, a water outlet for the compartment, a conduit connection between the top of the tank and the condenser means, for delivering steam thereto, and a gas vent for said condenser means.

7. An apparatus for deaerating and chemically treating a flow of water, comprising in combination a sedimentation tank, partition means in the tank so constructed and arranged as to define an inner chamber and an outer annular deaerating compartment extending part way down the tank, and a steam space in the top portion of the tank above said chambers, said chamber and compartment being in open communication above the top of the partition means, conduit means for introducing a flow of water into the tank and distributing it through said steam space over the upper portion of said inner chamber, vented condenser means constructed and arranged to heat the flow of water prior to its introduction to the tank, a chemical feed pipe extending through the tank and so constructed and arranged as to discharge chemical into the upper portion of the inner chamber, a pair of radial partitions located within said annular compartment terminating below the top of the tank and arranged to divide the compartment into two sub-compartments in open vapor communication at their tops, an uptake in the lower portion of the sedimentation tank, a conduit connection between the uptake and one of said sub-compartments, conduit means for introducing condensate into the other sub-compartment, a pair of separate outlet conduits extending from said sub-compartments out through the tank, so that condensate and make-up water are separately deaerated in said two sub-compartments, and a conduit connection from the top of the tank to said condenser means constructed and arranged to deliver steam and gases from said steam space above both sub-compartments to said condenser means.

8. The apparatus of claim 6, in which a conduit is provided, extending through the tank into the annular compartment and terminating at a point near the conduit connection from the uptake to said compartment, and arranged to deliever phosphate solution at that point.

9. In water treatment apparatus, means for removing gases from a flow of water, comprising in combination a vertical cylindrical side sheet, a top head and a bottom head, said side sheet and heads forming a tank, a cylindrical partition of smaller diameter than said side sheet located within said tank co-axially with the side sheet and spaced from said top head, an inner chamber surrounded by said partition, a space located between said cylindrical side sheet and said cylindrical partition, said chamber and space being in open communication with each other above the partition and below the top head, vented condenser means for preheating a flow of water by condensation of steam therein, means for feeding the preheated water into the tank and distributing it over the top portion of the chamber, conduit means for delivering steam from the interior of the tank to said preheating means, a water passage through the partition providing communication between said space and said chamber, outlet means for said space passing through the side sheet and spaced from said water passage so as to cause an extended flow of water from said passage through said space to said outlet means, a steam heating pipe near the bottom of said space, and means for introducing steam into said pipe.

SAMUEL B. APPLEBAUM.